(12) United States Patent
Mazzei et al.

(10) Patent No.: US 9,931,602 B1
(45) Date of Patent: Apr. 3, 2018

(54) APPARATUS AND METHOD OF INCREASING THE MASS TRANSFER OF A TREATMENT SUBSTANCE INTO A LIQUID

(71) Applicant: Mazzei Injector Company, LLC, Bakersfield, CA (US)

(72) Inventors: Angelo L. Mazzei, Bakersfield, CA (US); Srikanth S. Pathapati, Bakersfield, CA (US)

(73) Assignee: MAZZEI INJECTOR COMPANY, LLC, Bakersfield, CA (US)

( * ) Notice: Subject to any disclaimer, the term of this patent is extended or adjusted under 35 U.S.C. 154(b) by 0 days.

(21) Appl. No.: 15/632,088

(22) Filed: Jun. 23, 2017

(51) Int. Cl.
| | |
|---|---|
| *B01F 5/04* | (2006.01) |
| *B01F 3/08* | (2006.01) |
| *B01F 5/06* | (2006.01) |
| *G05D 11/035* | (2006.01) |
| *B01F 3/00* | (2006.01) |
| *B01F 3/04* | (2006.01) |

(52) U.S. Cl.
CPC .......... *B01F 5/0426* (2013.01); *B01F 3/0865* (2013.01); *B01F 5/0473* (2013.01); *B01F 5/0689* (2013.01); *B01F 3/04049* (2013.01); *B01F 2003/0021* (2013.01); *G05D 11/035* (2013.01)

(58) Field of Classification Search
CPC ........... Y10T 137/87346; G05D 11/035; B01F 5/0426; B01F 5/0473; B01F 5/0689; B01F 3/0865; B01F 3/04049; B01F 2003/0021
USPC ............................................ 138/44; 137/550
See application file for complete search history.

(56) References Cited

U.S. PATENT DOCUMENTS

| | | | | |
|---|---|---|---|---|
| 550,336 | A | * 11/1895 | Williams | ................ B05B 1/341 239/489 |
| 1,102,647 | A | * 7/1914 | Davis | ................... B01D 35/005 137/550 |
| 2,361,150 | A | * 10/1944 | Petroe | ................... B01F 5/0451 137/44 |
| 2,680,715 | A | 6/1954 | Cook | |
| 2,765,028 | A | * 10/1956 | Kienle | .................. F23D 11/408 239/487 |
| 3,612,087 | A | 10/1971 | Roland | |
| 3,788,825 | A | 1/1974 | Arenson | |
| 3,913,617 | A | 10/1975 | van Laar et al. | |
| 4,123,800 | A | 10/1978 | Mazzei | |
| 4,150,817 | A | 4/1979 | Regelin et al. | |
| 4,344,752 | A | * 8/1982 | Gallagher, Jr. | ....... B01F 5/0413 137/888 |

(Continued)

*Primary Examiner* — Jessica Cahill
(74) *Attorney, Agent, or Firm* — James M. Duncan, Esq.; Klein DeNatale Goldner

(57) ABSTRACT

An apparatus and method for increasing the mass transfer of a treatment substance into a liquid flowing in a pipe in a full pipe flow regime has a diversion conduit which receives a portion of the liquid. The portion of the liquid is mixed with a treatment substance and then reintroduced into the pipe at a downstream location through an injection structure. Between the diversion conduit, on the upstream side, and the injection structure, on the downstream side, there are a plurality of flow vanes disposed circumferentially about a cylindrical inner wall of the pipe, where each flow vane extends radially inward toward a central axis of the pipe, extending into the main stream flow of the liquid. Another embodiment of the invention has a flow grid located downstream of the injection structure.

34 Claims, 10 Drawing Sheets

(56) References Cited

U.S. PATENT DOCUMENTS

| | | | |
|---|---|---|---|
| 4,647,212 A | | 3/1987 | Hankison |
| 4,722,363 A | | 2/1988 | Allyn |
| 5,494,576 A | | 2/1996 | Hoppe et al. |
| 5,674,312 A | | 10/1997 | Mazzei |
| 5,863,128 A | * | 1/1999 | Mazzei ................. B01F 5/0415 137/888 |
| 5,894,995 A | * | 4/1999 | Mazzei ................. B01F 5/0206 239/489 |
| 5,951,922 A | | 9/1999 | Mazzei |
| 6,000,418 A | | 12/1999 | Kern, Jr. et al. |
| 6,193,893 B1 | | 2/2001 | Mazzei et al. |
| 6,623,154 B1 | * | 9/2003 | Garcia ................. B01F 5/0415 137/888 |
| 6,685,825 B1 | | 2/2004 | Chang |
| 6,726,354 B1 | | 4/2004 | Breuer et al. |
| 6,730,214 B2 | | 5/2004 | Mazzei |
| 6,796,704 B1 | | 9/2004 | Lott |
| 6,896,401 B2 | | 5/2005 | Wolfert et al. |
| 7,357,565 B2 | | 4/2008 | Gopalan et al. |
| 7,779,864 B2 | | 8/2010 | Mazzei |
| 8,322,381 B1 | * | 12/2012 | Glanville ............... B01F 5/0616 138/37 |
| 2003/0015481 A1 | | 1/2003 | Eidem |
| 2009/0314702 A1 | | 12/2009 | Mazzei |

\* cited by examiner

APPARATUS AND METHOD OF INCREASING THE MASS TRANSFER OF A TREATMENT SUBSTANCE INTO A LIQUID

BACKGROUND OF THE INVENTION

The present invention generally relates to improving the mixing efficiency of an additive in a liquid flowing under pressure through a large diameter conduit. The present invention more particularly relates to mixing systems in which a side stream is diverted from the main liquid flow, an additive mixed with the side stream, and the concentrated mixture injected back into the large diameter conduit.

The present invention is applicable to treatment of liquids by the infusion of additives. While the structural components of the invention may be utilized for treating many kinds of liquids, its principal application will be in the field of water treatment where there is substantial volumetric flow. For example, embodiments of the present invention may be utilized in municipal waste water treatment facilities where flow rates are at least 500 gallons per minute, and generally much higher. In such systems, it is desired to achieve effective and efficient blending of the returning side stream into the main flow of liquid. The volumes of water requiring treatment are typically substantial, and reducing or eliminating the amount of time required for any storage of the liquid is desirable. Thus treating the water as it is flowing—as opposed to processes employing settling ponds and/or holding tanks—can be advantageous in expediting the treatment process and reducing capital expenditures by reducing the required storage capacity of the overall system. These dynamic mixing systems provide even more advantage when the volume of the side stream can be reduced because of the corresponding reduction in energy required for processing the side stream and infusing the side stream back into the main flow of liquid.

The treatment substances utilized with the present invention may be in the form of a gas, liquid or slurry, where the treatment substance is capable of being mixed with the side stream through a mixing apparatus, such as a venturi mixing injector, chemical mixer, mixing nozzle. One well-known example of a treatment substance is ozone which is a very effective disinfectant chemical which is in gas form which decomposes into molecular oxygen at standard temperature and pressure. As described in U.S. Pat. No. 7,779,864, in which one of the inventors herein is named as an inventor, ozone may be mixed with the mixing apparatus into the side stream and then infused through nozzles into a large diameter conduit into a mainstream of flowing liquid. The conduit is a large pipe often on the order of 48 inches in diameter.

The object of present invention is to improve the transfer efficiency of the treatment substance into the flowing stream. Improvements in transfer efficiency will result in reduction of the treatment time required for the flowing stream, which can minimize retaining the water for additional treatment and prevents "over-dosing" the stream in order to be assured of a sufficiency throughout the treated liquid. In other words, improving the mass transfer efficiency may reduce initial capital investment in the system and reduce the operating expense for the system.

SUMMARY OF THE INVENTION

Embodiments of the present invention provide an apparatus and a method which may be applied to the need described above to improve the transfer efficiency of a treatment substance with a liquid mainstream flowing through a large diameter conduit. In the fluid handling systems to which the present invention may be applied there is a pipe having a cylindrical inner wall having a central axis, wherein a liquid flows in a full pipe flow regime (i.e., a pressurized system) through the pipe.

In a first embodiment of the apparatus, a diversion conduit provides a diversion flow of a portion of the flow of liquid from an upstream location. The diversion conduit diverts the portion of the flow of liquid to outside of the pipe where a treatment substance mixing apparatus mixes a treatment substance with the portion of liquid resulting in a first mixture made up of the originally diverted liquid flow having a relative high concentration of the treatment substance. This first mixture is returned to the pipe via an injection structure which injects the first mixture into the pipe at a downstream location, where the first mixture mixes with the liquid mainstream resulting in a second mixture. Between the upstream location and the downstream location there are a plurality of flow vanes disposed circumferentially about the cylindrical inner wall of the pipe. Each of the flow vanes extends radially inward from the inner wall of the pipe toward the central axis of the pipe. As explained further below, this plurality of flow vanes configured in the pipe between the upstream location where the diversion conduit takes the portion and the downstream location where the first mixture is infused into the mainstream flow by the injection structure significantly—and unexpectedly—improves the transfer efficiency of the treatment substance into the mainstream flow.

The injection structure may comprise any structure which introduces a mixture of a treatment substance and a carrier fluid from the exterior of the pipe into the interior of the pipe, such as various inlet mechanisms known in the art. Among the known injection structures are nozzles. In embodiments of the present invention, the injection structure may comprise a number of different configurations of nozzles which extend through the cylindrical wall. These configurations may include, by way of example, single nozzles, a plurality of nozzles in axial alignment along the pipe, a plurality of nozzles in random distribution along the pipe, a pair of opposite facing nozzles on opposite sides of the pipe, and a plurality of pairs of nozzles in opposite facing relation. For installations comprising a plurality of nozzles, each nozzle of the plurality of nozzles may receive a substantially equal portion of the first mixture, the nozzles so disposed and arranged as to inject the equal portion of the first mixture into the mainstream flow at the downstream location. Each nozzle of the plurality of nozzles may be spaced apart linearly along a length of the pipe from each adjacent nozzle. The plurality of nozzles may be configured as a plurality of pairs of nozzles, where each pair of nozzles is spaced apart linearly along a length of the pipe from an adjacent pair of nozzles. A pair of nozzles may be disposed such that a first nozzle of the pair and a second nozzle of the pair are installed within a length of the pipe where the first nozzle and the second nozzle are in opposite facing relation as each nozzle injects the first mixture into the flowing stream of the pipe.

In another embodiment of the invention, a booster pump may be hydraulically connected to the diversion conduit, where the booster pump is configured to receive the diversion flow and boost the pressure of the diversion flow. Such an embodiment may further include an aspirating injector which receives the diversion flow from the booster pump and mixes the treatment substance with the diversion flow.

As a result of the increased transfer efficiencies realized through embodiments of the present invention, it is possible to reduce the volume of the diversion flow to as little as 3% of the total fluid flow through the pipe. In other cases, for example were air is utilized as the treatment substance, it may be desirable to have a substantial diversion flow, for example up to 40% of the total fluid flow through the pipe. Thus, embodiments of the present invention provide a wide range of treatment options made possible through the increased transfer efficiencies realized by the utilization of the plurality of flow vanes utilized between the upstream location where the diversion conduit takes the portion and the downstream location where the first mixture is infused into the mainstream flow by the injection structure.

The inventors herein have found that an additional structure in the pipe disposed downstream of the injection structure may further increase the transfer efficiency. This structure—a flow grid placed in a location downstream of the infusion of the mixture of treatment substance and diverted flow—is a flow grid which is disposed perpendicular to the central axis of the pipe, where the flow grid has an upstream face pointing upstream and an downstream face pointing downstream. The flow grid may be made up of a plurality of intersection grid members. The flow grid may further be configured into a semi-circular shape having a diagonal base member. With this embodiment, the flow grid may have a radius of curvature which allows it to be placed within the circle defined by the internal diameter of the pipe, with the circumferential edge of the flow grid abutting the internal circumferential surface of the pipe. Moreover, where the cross-sectional area of the pipe defines a circle of 360 degrees and the top of the pipe is defined as having a zero degree position (i.e., twelve o'clock), a grid member may be disposed within the pipe such that the diagonal base member has a first end adjacent to an approximate 60 degree position (i.e., 2 o'clock) and a second end adjacent to an approximate 240 degree position (i.e., 8 o'clock).

A flow grid having a semi-circular shape may be further sectioned into a first half of the semi-circular shape and a second half of the semi-circular shape, where each half has a plurality of intersecting grid members set in a parallel configuration with the diagonal base member. The flow grid has a thickness extending from the upstream face to the downstream face, where the intersecting grid members may extend from the upstream face to the downstream face. In this configuration, the intersecting grid members may be angled with respect to the central axis of the pipe. The inventors herein have found that angling of the grid members further promotes transfer efficiency. In one embodiment, the grid members of the first half of the semi-circular shape may be set between the upstream face and the downstream face to form an angle of approximately 10 degrees upward from the central axis. Likewise, the grid members of the second half of the semi-circular shape may be set between the upstream face and the downstream face to form an angle of approximately 10 degrees downward from the central axis of the pipe. With this combination—one side of the flow grid imparting an upward flow of the liquid and the other side of the flow grid imparting a downward flow of the liquid—the transfer efficiency is further increased.

The flow grid utilized in embodiments of the invention may be configured such that the openings defined between the intersecting grid members are either square or rectangular. The size of the openings may also be adjusted to change the transfer characteristics of the treatment substance. One embodiment may have square openings where each opening is 2 inches by 2 inches. Alternatively, for rectangular openings, the opening may have a minimum height of 1 inch and a minimum width of 2 inches.

Because of the large volume of liquids processed through these systems, the pipe will have a diameter typically utilized for municipal operations and have a diameter greater than ten inches. The treatment substance will typically be a gas and, depending upon the application, may be ozone, oxygen, chlorine, and air.

Methods of the present invention for increasing the mass transfer of a treatment substance into a liquid flowing through a piping system include the steps of diverting a portion of the liquid flowing through the pipe from a first upstream location, leaving a main stream flow passing through the pipe and through a plurality of vanes disposed circumferentially about an interior wall of the pipe. The diverted liquid is flowed through a treatment mixing apparatus which mixes a treatment substance into the diverted liquid resulting in a mixture. This mixture is injected into the pipe downstream of the mixing vanes. The treatment substance may be a gas such as ozone, oxygen, chlorine or air. The mixture may have a gas liquid ratio of at least 5%. The diverted fluid may comprise 3 percent to 40% of the total liquid flowing through the pipe.

DETAILED DESCRIPTION OF THE INVENTION

Figure 1:
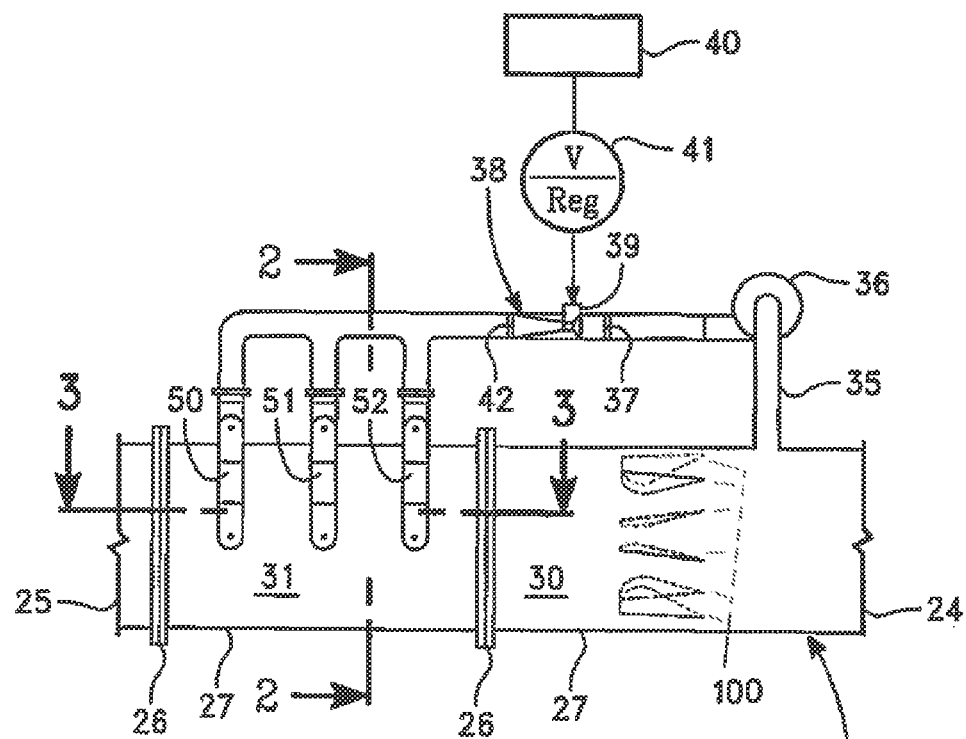
FIG. 1 depicts a side view of an embodiment of the invention.
Figure 2:
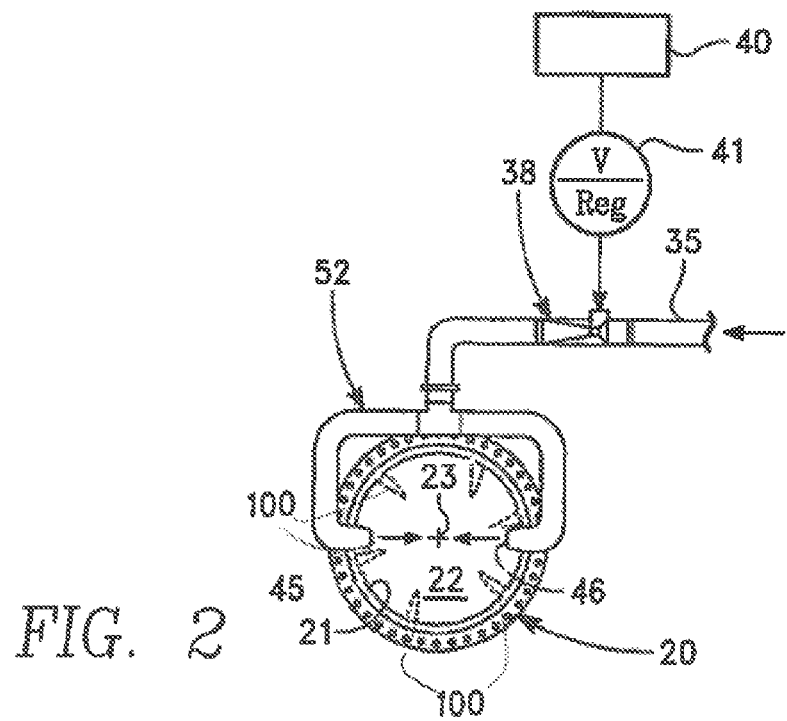
FIG. 2 is a sectional view taken along line 2-2 of FIG. 1.
Figure 3:
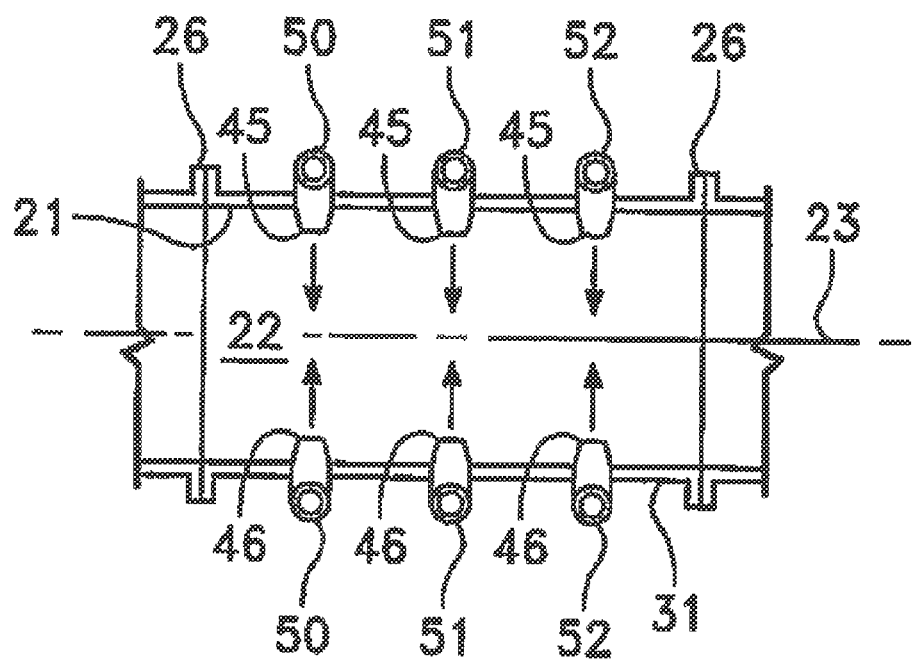
FIG. 3 is a sectional view taken along line 3-3 in FIG. 1.

Referring now to the Figures, FIGS. 1-3 illustrate a system previously disclosed by one of the inventors here, as set forth in U.S. Pat. No. 7,779,864, but which has been modified according to the present invention by the addition of flow vanes 100 downstream of diversion conduit 35 but upstream of nozzles 45,46.

The '864 patent taught a pipe 20 having a cylindrical wall 21 which formed a flow passage 22 having a central axis 23. End 24 is regarded as an upstream inlet end and end 25 is regarded as a downstream outlet end. Flanges 26 are shown by means of which segments 27 can be installed in the completed pipe. The main flow of liquid, in this example water, flows from inlet 24 to outlet 25. In operation, pipes of this type operate full, and the stream may flow at axial rates ranging from 0.75 feet per second to 5 feet per second. In large diameter pipelines, say forty-eight inch or larger, these flow rates represent a very substantial flow of water, and injection/infusion to treatment substances must be quick and reliable. Embodiments of the present invention will generally be utilized in conduits having a diameter of 18 to 84 inches, with an operating pressure of approximately 10 psig.

The '864 patent notes with respect to FIG. 1 of that patent, that for that invention there are negligible, if any, structural features between the upstream region 30 and the downstream region 31, related to the infusion apparatus, such that the invention disclosed in the '864 had negligible energy loss from disruption of the main flow. In contrast, as noted above, embodiments of the present invention include a structural feature—flow vanes 100—between the diversion conduit 35 in the upstream region 30 and the injection structure, which for this embodiment comprises nozzles 45, 46 located in the downstream region 31.

The object of this invention is to provide increased transfer efficiency between a treatment substance and the main flow of liquid in the pipe 20. A diversion conduit 35 provides a diversion of a first portion of the flow of the liquid from the upstream region 30. Pump 36 draws a diversion stream from the main flow and boosts its pressure. After the pump 36, the diversion stream is directed to the inlet port 37 of an aspirating injector 38. The pressure applied to the diversion stream is sufficient to operate an aspirating injector 38 and to return the diversion stream to the mainstream flow in pipe 20. In most applications, the raise in pressure will be about 30 psi. Aspirating injector 38 includes a port 39 which receives a proportioned supply of treatment substance from source 40. A regulator valve 41 passes the substance at a controlled pressure to port 39. Most frequently the treatment substance will be a gas, and may include ozone, oxygen, chlorine and air. A mixture is formed once the diversion stream is infused with the treatment substance, where the mixture comprises a concentrated treatment stream for infusion back into the mainstream flow.

The diversion conduit 35 continues from the outlet end 42 of the aspirating injector 38 to at least one nozzle 45 or a pair of nozzles 45, 46 as shown in FIG. 2. If used as pairs, the nozzles 45, 46 receive an identical supply of treatment substance, and may be regarded as manifolded. As shown in FIGS. 2 and 3, the opposing nozzles in a pair may be configured such that an axis extending from a nozzle may coincide from the axis of an opposite facing nozzle.

As further shown in FIG. 1, a plurality of pairs of nozzles 50, 51, 52 may be manifolded from the diversion conduit 35. A single nozzle 45, a pair of nozzles 45, 46 or a plurality of pairs of nozzles 50, 51, 52 may be used in embodiments of the invention. If desired, valves may be inserted just upstream from each nozzle so that the nozzles can be utilized individually, in pairs, or other desired configuration to return the mixture into the mainstream flow. As indicated in FIG. 1, a single aspirating injector 38 can be utilized to supply all of the nozzles. The system size and capacity will determine whether multiple aspirating injectors 38 are required or whether a single one is sufficient.

Figure 4:
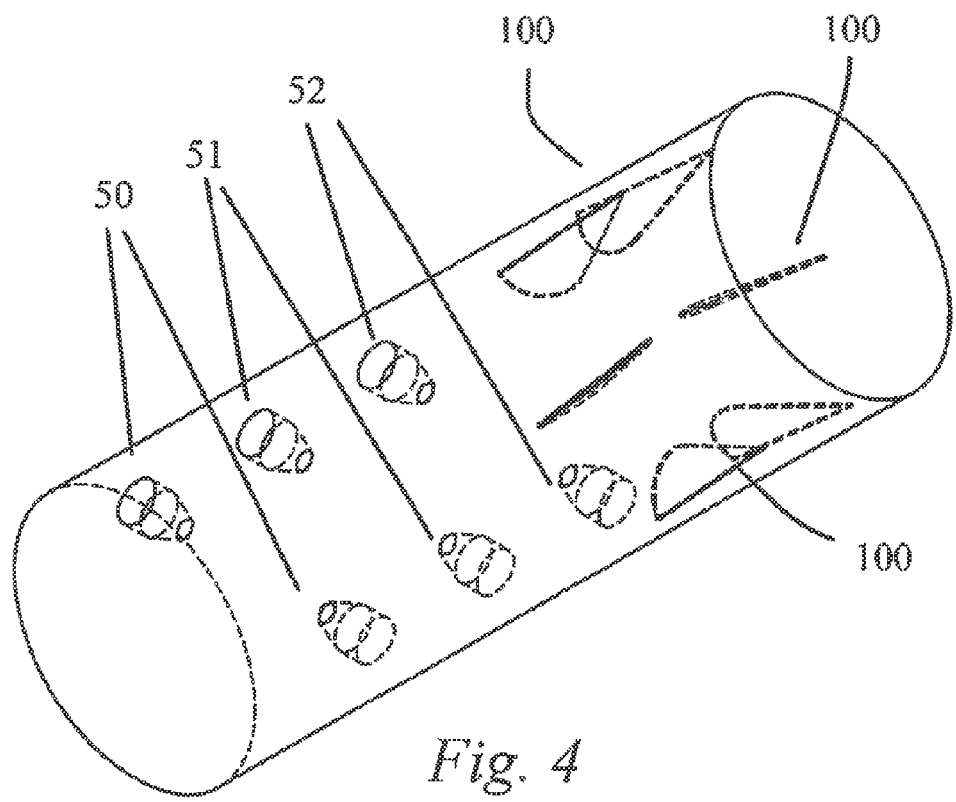
FIG. 4 is a perspective view depicting a pipe segment of an embodiment of the present invention, showing the location of the flow vanes and a downstream injection structure.
Figure 5:
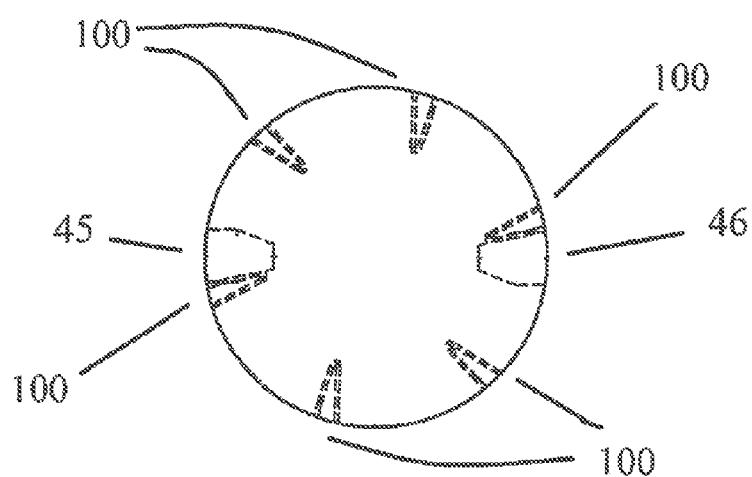
FIG. 5 shows an end view of the pipe segment depicted in FIG. 4.
Figure 6:
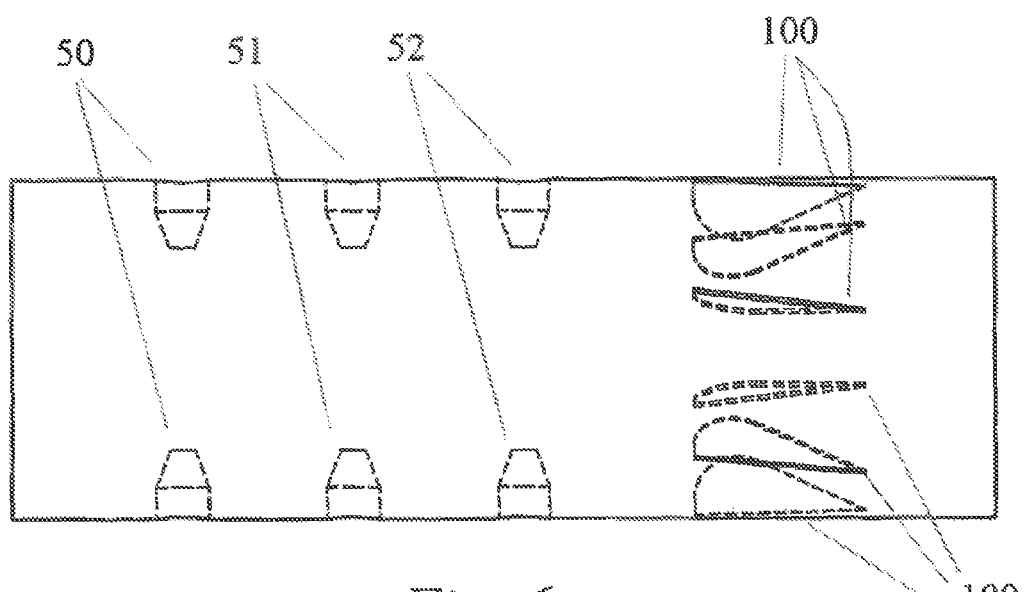
FIG. 6 shows a top section view of the pipe segment depicted in FIG. 4.

As stated above, embodiments of the present invention include flow vanes 100 which are located downstream of the diversion conduit 35 but upstream of nozzles 45,46. FIG. 4 depicts a pipe segment of an embodiment of the present invention, showing the location of the flow vanes 100 and a downstream injection structure which, for the embodiment shown in FIG. 4, are opposing pairs of nozzles 50, 51, 52. FIG. 5 shows an end view of the pipe segment depicted in FIG. 4, looking upstream seeing first nozzles 45, 46 and flow vanes 100 even further upstream. FIG. 6 shows a top sectioned view of the pipe segment depicted in FIG. 4, again showing the flow vanes 100 and opposing pairs of nozzles 50, 51, 52. The flow vanes will generally be located a linear distance of 0.2 to 3.0 pipe diameters upstream of the nozzles.

Figure 7:
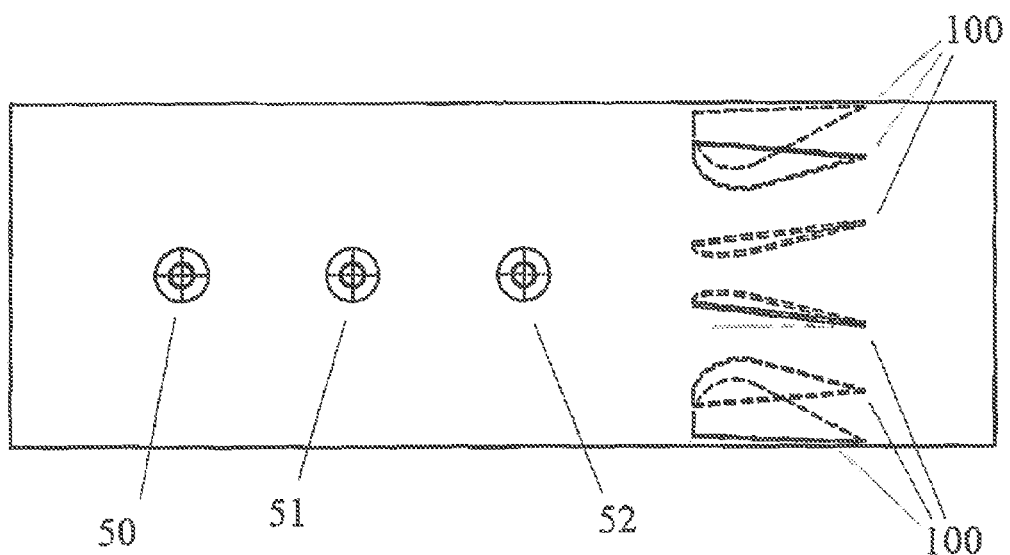
FIG. 7 shows a side section view of the pipe segment depicted in FIG. 4.
Figure 8:
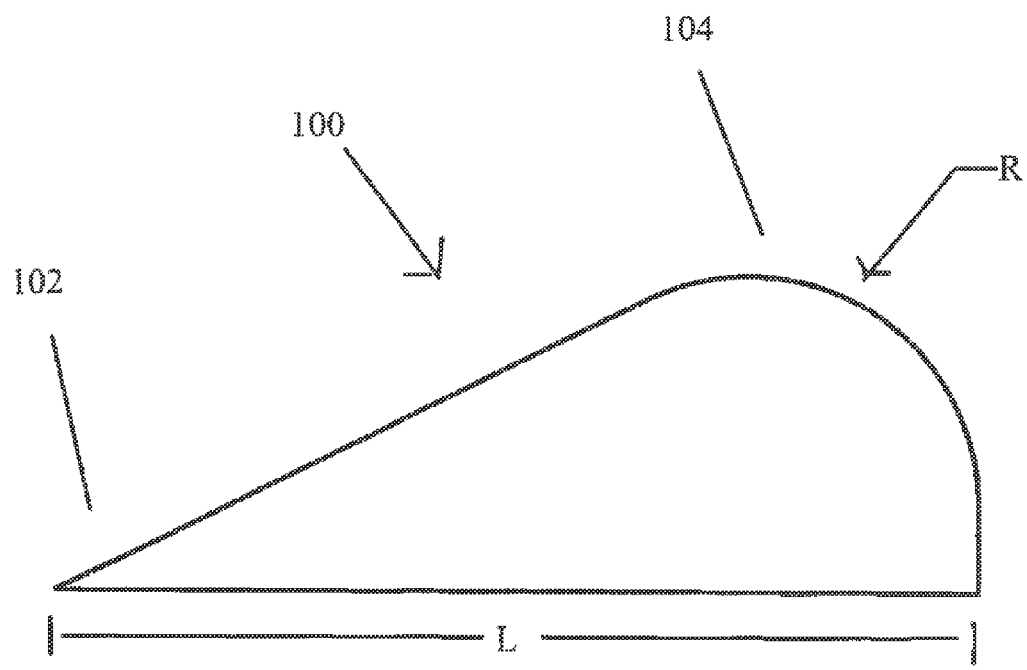
FIG. 8 depicts a side view of an embodiment of a flow vane which may be utilized in embodiments of the present invention.
Figure 9:
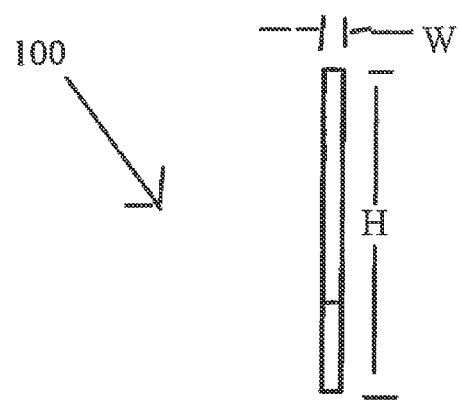
FIG. 9 shows an end view of the flow vane depicted in FIG. 8.
Figure 10:
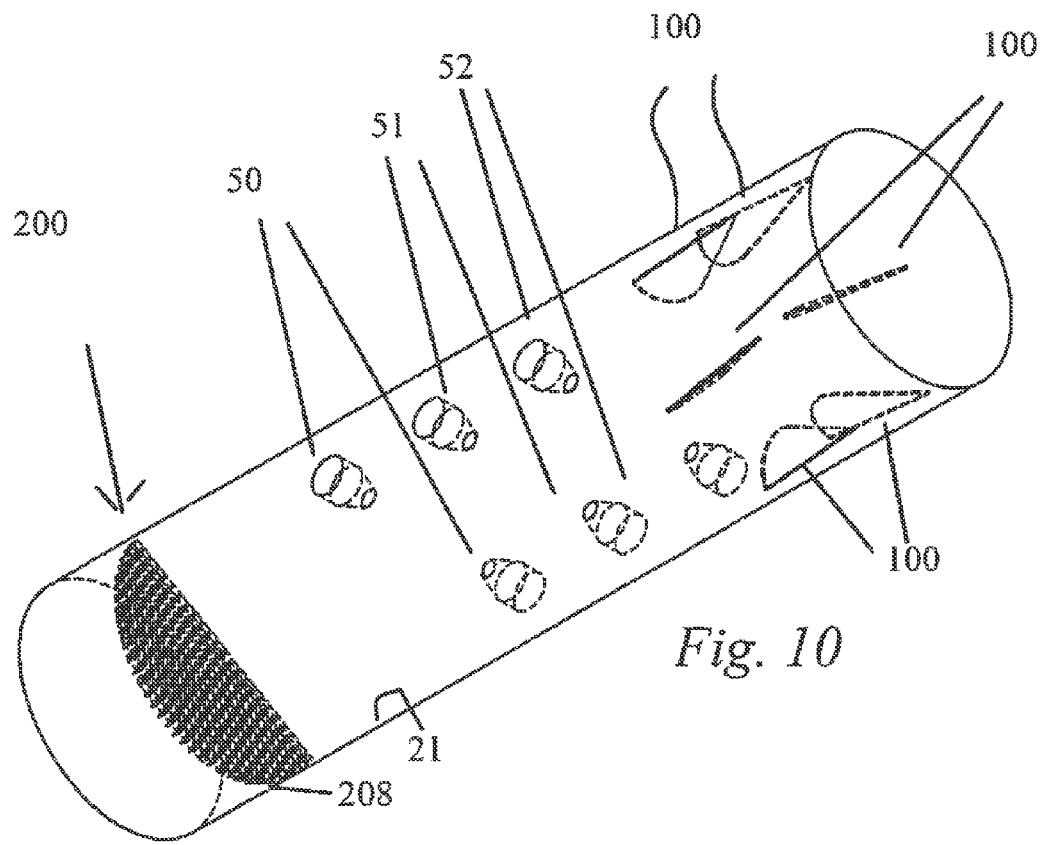
FIG. 10 shows a perspective view of a pipe segment of an embodiment of the present invention, showing the location of the flow vanes, a downstream injection structure, and a flow grid disposed downstream of the injection structure.
Figure 11:
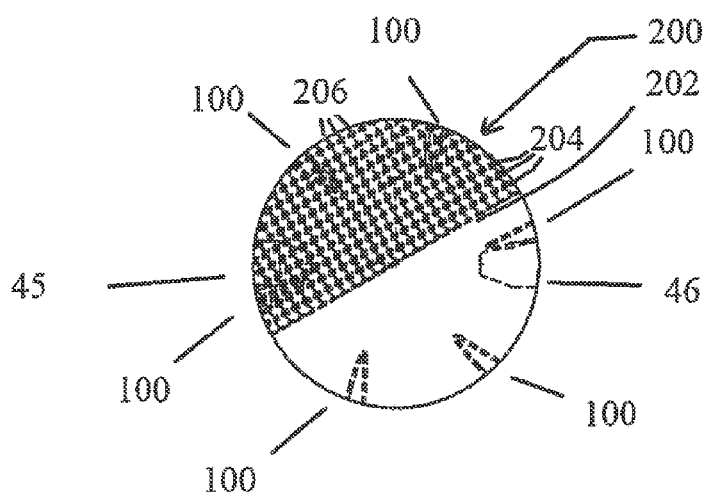
FIG. 11 shows an end view of the pipe segment depicted in FIG. 10.
Figure 12:
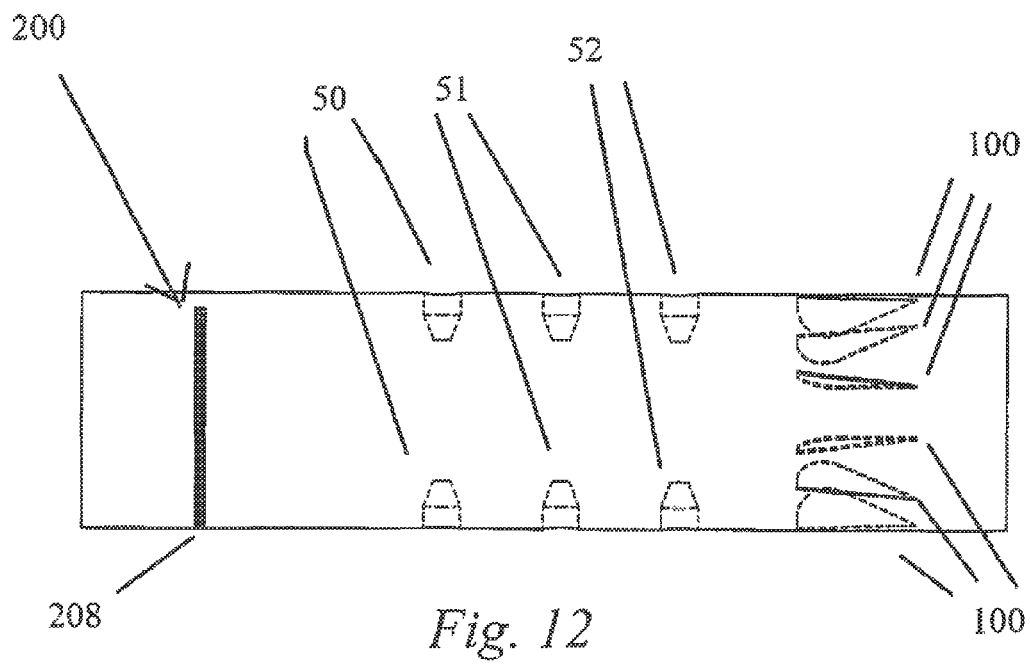
FIG. 12 shows a top view of the pipe segment depicted in FIG. 10.
Figure 13:
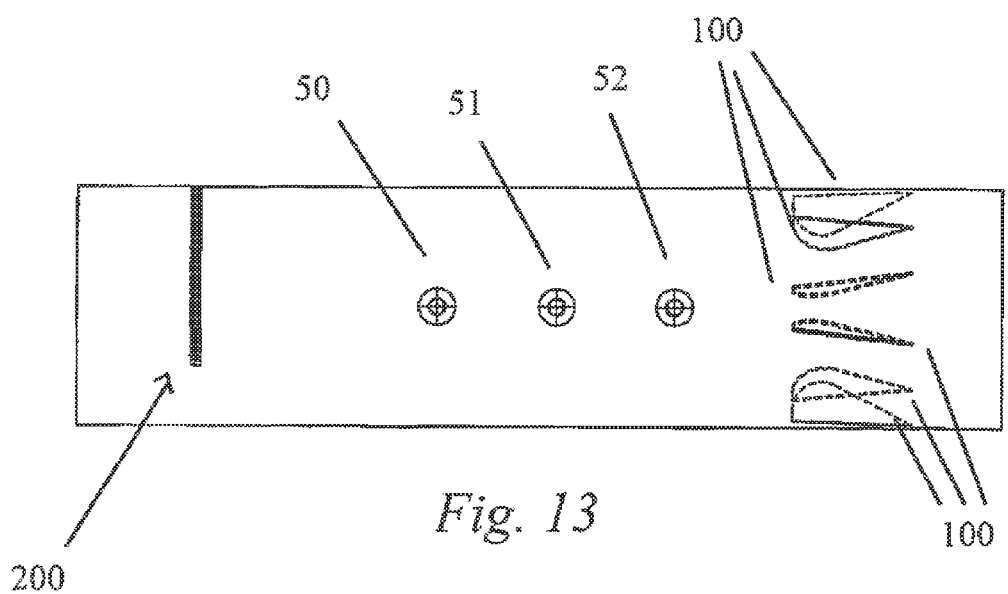
FIG. 13 shows a side view of the pipe segment depicted in FIG. 10.

FIG. 8 depicts a side view of an individual flow vane 100, showing the flow vane in greater detail. The flow vanes 100 are disposed circumferentially about the cylindrical inner wall 21 of the pipe 21, with each flow vane extending radially inward toward the central axis 23. The inventors herein have found that a total of six flow vanes 100 having equal spacing provides effective service. The flow vanes 100 may be installed, as best shown in FIGS. 6 and 7, to be slightly angled from the central axis 23 and to have alternating 7 degree orientations. As further indicated in FIG. 8, the leading edge 102 of each flow vane 100 may have a generally angular profile, with the trailing edge 104 having a curved profile. Flow vanes 100 may have a length L, a height H and a thickness W, and the trailing edge 104 may have a radius of curvature R. As an example, for a 48 inch diameter pipe, each flow vane 100 may have a length of 24 inches, a height of 8.3 inches and a thickness of 0.5 inch. Trailing edge 104 may have a radius of curvature of 6 inches.

FIGS. 10 through 16 show an embodiment of the apparatus which includes a flow grid 200 which is placed downstream of the injection structure, which in this embodiment comprises opposing pairs of nozzles 50, 51, 52. The flow grid 200 may be configured to have a semi-circular shape as the embodiment shown in FIGS. 10, 11 and 14 and have a diagonal base member 202. The flow grid 200 may be made up of a plurality of intersecting grid members such as first members 204 which are a parallel to the diagonal base member 202 and second members 206 which are perpendicular to the diagonal base member. With this embodiment, the flow grid 200 may have a radius of curvature which allows it to be placed within the cylindrical wall 21 of the pipe 20, where the circumferential edge 208 of the flow grid 200 abuts the internal cylindrical wall.

Figure 14:
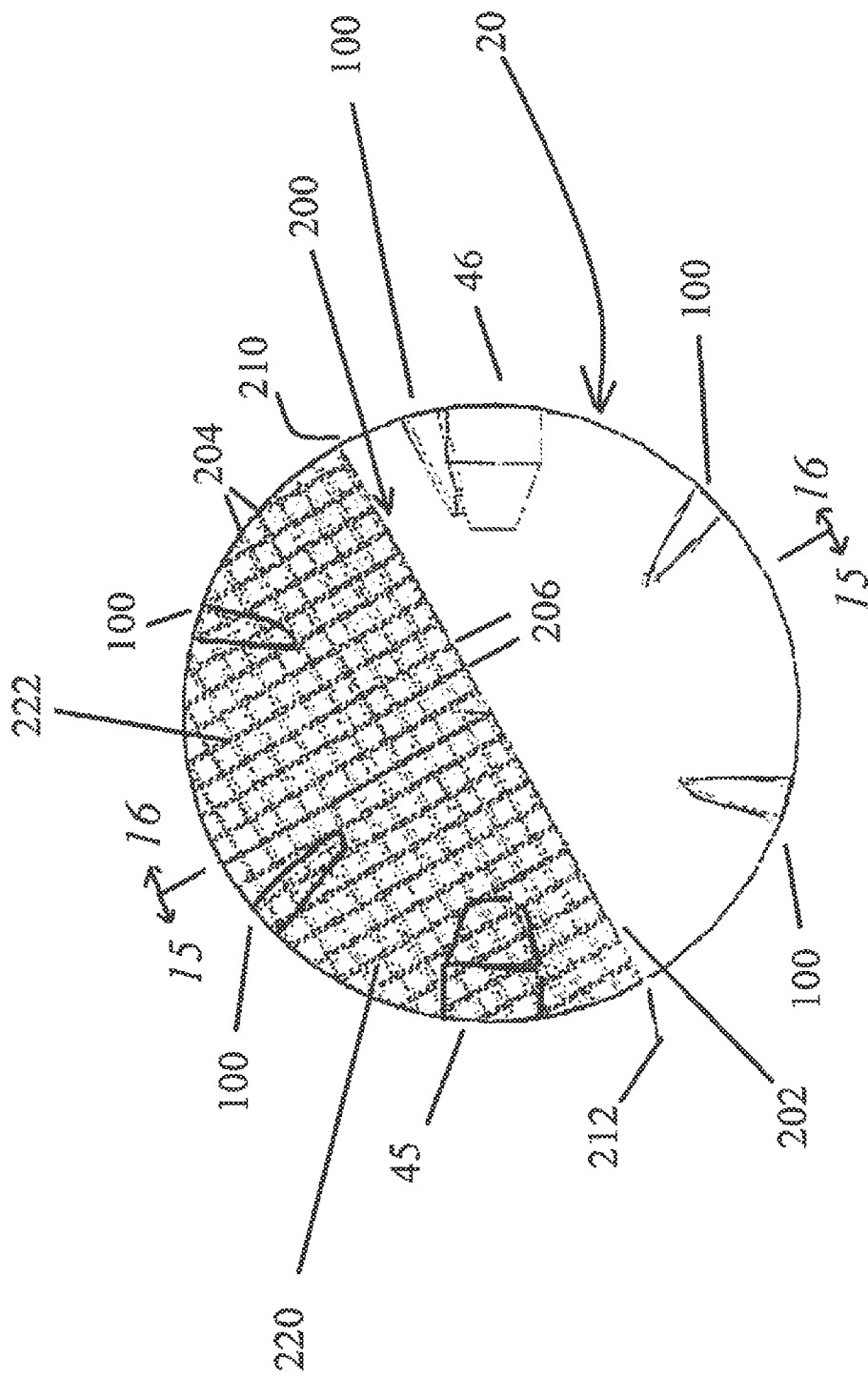
FIG. 14 shows an end view of the pipe segment depicted in FIG. 10.

As best shown in FIG. 14, where the cross-sectional area of the pipe 20 defines a circle of 360 degrees and the top of the pipe is defined as having a zero degree position (i.e., twelve o'clock), the diagonal base member 202 may have a first end 210 adjacent to an approximate 60 degree position (i.e., 2 o'clock) and a second end 212 adjacent to an approximate 240 degree position (i.e., 8 o'clock).

A flow grid 200 having a semi-circular shape may be further sectioned into a first half 220 and a second half 222 of the semi-circular shaped flow grid 200, where each half has a plurality of grid members 204 set in a parallel configuration with the diagonal base member 202, and intersecting grid members 206 which are set perpendicular to the diagonal base member 202. The flow grid 200 has a thickness T extending from the upstream face 224 to the downstream face 226, where the intersecting grid members may extend from the upstream face to the downstream face. By way of example, thickness T may equal 2 inches for a flow grid 200 used in a pipe having a 48 inch diameter. In this configuration, grid members 204 may be angled with respect to the central axis of the pipe to improve transfer efficiency.

Figure 15:
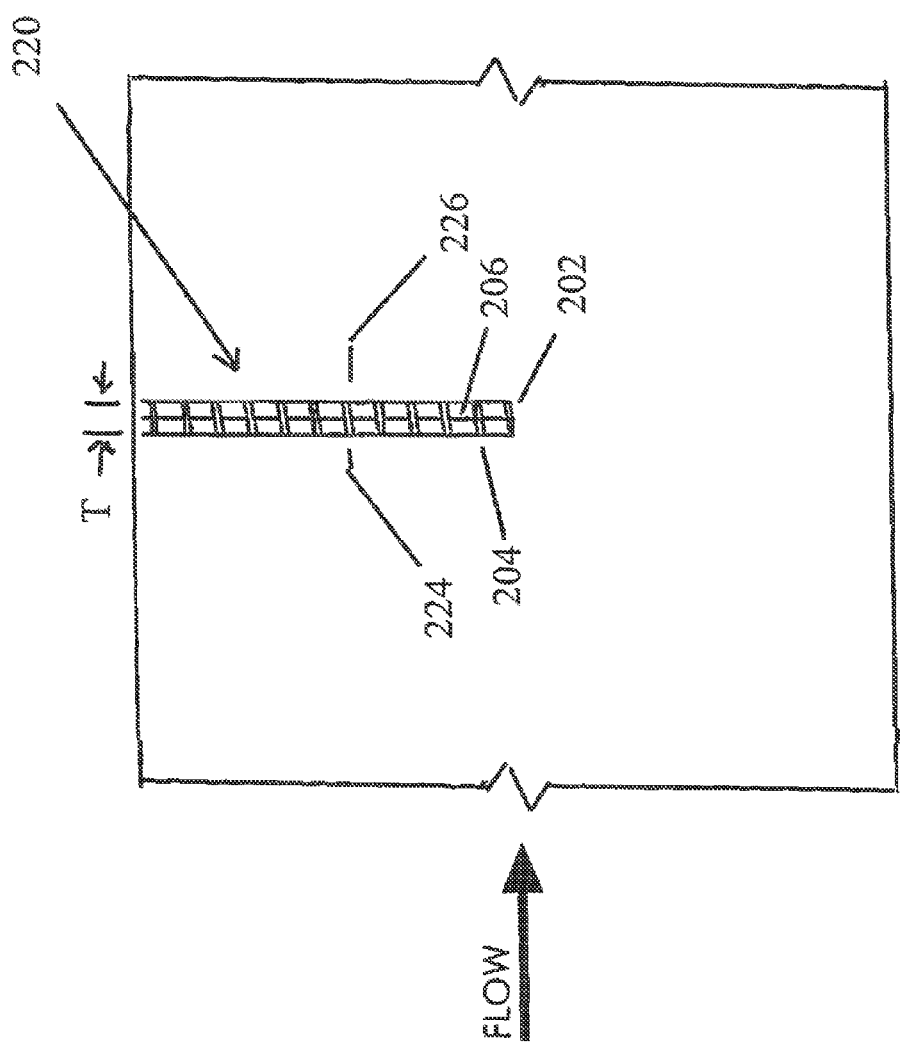
FIG. 15 is a side sectional view of a semi-circular flow grid taken along line 15-15 of FIG. 14 showing the orientation of the grid members on the left-hand side of the flow grid.

In the embodiment depicted in FIG. 15, as grid members 204 of the first half 220 of the semi-circular shaped flow grid 200 extend between the upstream face 224 to the downstream face 226, the grid members 204 form an angle of approximately 10 degrees upward from the central axis or flow axis.

Figure 16:
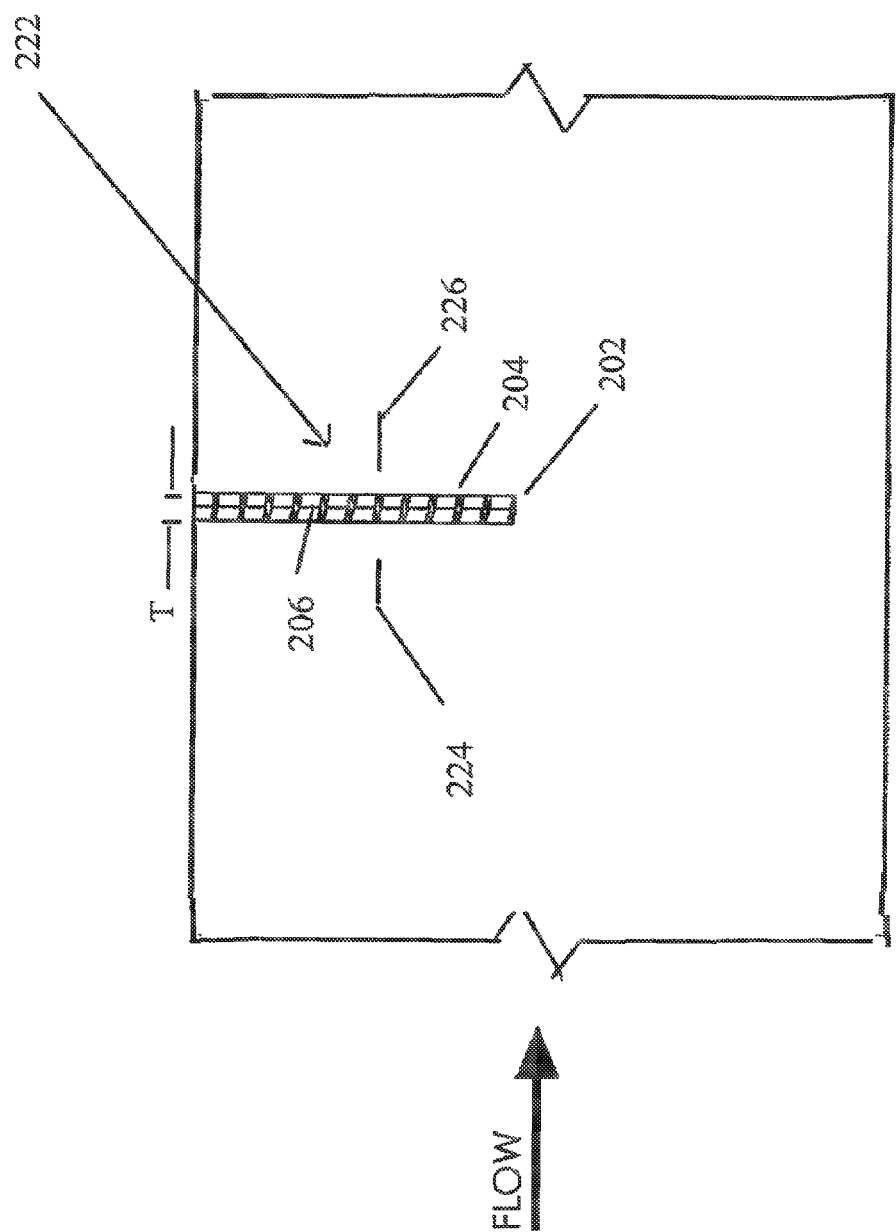
FIG. 16 is a side sectional view of a semi-circular flow grid taken along line 16-16 of FIG. 14 showing the orientation of the grid members on the right-hand side of the flow grid.

Likewise, as illustrated in FIG. 16, as grid members 204 of the second half 222 of the semi-circular shaped flow grid 200 extend between the upstream face 224 to the downstream face 226, the grid members form an angle of approximately 10 degrees downward from the central axis or flow axis.

The flow grid 200 utilized in embodiments of the invention may be configured such that the openings defined between the intersecting grid members 204, 206 are either square or rectangular. The size of the openings may also be adjusted to change the transfer characteristics of the treatment substance. One embodiment may have square openings where each opening is 2 inches by 2 inches. Alternatively, for rectangular openings, the opening may have a minimum height of 1 inch and a minimum width of 2 inches.

The inventors herein have created a flow simulation model using computational flow dynamics ("CFD") to ascertain the impact of various variables on the mass transfer. Table 1 below summarizes the results of the modeling for a pipe having a diameter of 48 inches having a flow velocity of 1.5 feet/second. The upper part of Table 1 shows the mass transfer for the situation where the volume of liquid diverted into the diversion conduit 35 is 10% of the total flow volume of the pipe 20. The lower part of Table 1 shows the mass transfer for the situation where the volume of liquid diverted into the diversion conduit is 5% of the total flow volume of the pipe 20. The "standard PFR without vanes" described in Table 1 is the apparatus disclosed and claimed in U.S. Pat. No. 7,779,864. The second figuration—"Standard PFR with upstream flow vanes"—is the embodiment generally depicted in FIGS. 4-7 herein. The third configuration—"Standard PFR with upstream flow vanes and downstream mixing flow grid—is the embodiment generally depicted in FIG. 10-13 herein. As demonstrated by the CFD analysis, embodiments of the present invention provide the ability to substantially reduce the flow rate through the pipe without adversely impacting the mass transfer. Given the typical design flow rates of 4 to 5 feet/second, the flow rate of 1.5 feet/second is an extreme scenario. However, as demonstrated by the results reported in Table 1, the present invention provides a substantial ability to turn down the flow rate and maintain acceptable mass transfer.

TABLE 1

Ozone Mass Transfer Computational Fluid Dynamic Analysis Results:

| Pipeline velocity (ft/s) (Diameter = 48 inches) | Configuration | Mass transfer at 3 pipe diameters | Uniformity at 3 pipe diameters | Mass transfer at 6 pipe diameters | Uniformity Index at 6 pipe diameters | Mass transfer at 10 pipe diameters | Uniformity Index at 10 pipe diameters |
|---|---|---|---|---|---|---|---|
| 1.5 ft/s at 10% sidestream ratio, 0.2 gas to liquid ratio | Standard PFR without vanes | 64% | 75% | 67% | 78% | 72% | 81% |
| | Standard PFR with upstream flow vanes | 71% | 80% | 73% | 83% | 79% | 85% |
| | Standard PFR with upstream flow vanes and downstream mixing flow grid | 85% | 86% | 88% | 87% | 90% | 89% |
| 1.5 ft/s at 5% sidestream ratio, 0.2 gas to liquid ratio | Standard PFR without vanes | 58% | 73% | 64% | 75% | 66% | 77% |
| | Standard PFR with upstream flow vanes | 64% | 77% | 70% | 80% | 75% | 83% |
| | Standard PFR with upstream flow vanes and downstream mixing flow grid | 77% | 83% | 84% | 85% | 86% | 87% |

Mass transfer into clean water (no ozone demand)
Ozone dose of 1 mg/L
Water temperature = 25 C.
Pipeline pressure = 10 psi

Having thus described the preferred embodiment of the invention, what is claimed as new and desired to be protected by Letters Patent includes the following:

1. In combination with a pipe, said pipe having a cylindrical inner wall with a central axis, providing for a flow of a liquid including flow from an upstream location to a first downstream location in a full pipe flow regime, an apparatus to increase mass transfer of a treatment substance into the liquid comprises:
   (a) a diversion conduit for externally providing a diversion flow of a first portion of the flow of the liquid from the upstream location to the first downstream location, the diversion conduit receiving the diversion flow from the flow of the liquid, leaving a main stream flow of the liquid inside the pipe flowing from the upstream location to the first downstream location;
   (b) a treatment substance mixing apparatus which mixes a treatment substance with the diversion flow resulting in a first mixture;
   (c) an injection structure which injects the first mixture into the pipe at the first downstream location resulting in a second mixture comprising the first mixture and the main stream flow of the liquid; and
   (d) a plurality of flow vanes disposed circumferentially about the cylindrical inner wall, the plurality of flow vanes disposed between the upstream location and the first downstream location, each said flow vane attached to and extending from the inner wall and extending radially inward toward the central axis from said cylindrical inner wall and extending into the main stream flow of the liquid.

2. The apparatus of claim 1 wherein the injection structure comprises a plurality of nozzles extending through the cylindrical inner wall.

3. The apparatus of claim 2 wherein each nozzle of the plurality of nozzles receives a substantially equal portion of the first mixture, each nozzle so disposed and arranged as to inject said equal portion of the first mixture into said downstream location.

4. The apparatus of claim 3 wherein each nozzle of the plurality of nozzles is spaced apart linearly along a length of the pipe from an adjacent nozzle.

5. The apparatus of claim 3 wherein the plurality of nozzles comprises a plurality of pairs of nozzles, wherein each pair comprises a first nozzle and a second nozzle, wherein each pair of nozzles is spaced apart linearly along a length of the pipe from an adjacent pair of nozzles.

6. The apparatus of claim 5 wherein the first nozzle and the second nozzle are disposed in the pipe in opposite facing relation.

7. The apparatus of claim 1 wherein a booster pump is hydraulically connected to the diversion conduit, wherein the booster pump is configured to receive the diversion flow and boost the pressure of the diversion flow.

8. The apparatus of claim 7 wherein the treatment substance mixing apparatus comprises an aspirating injector which receives said diversion flow from the booster pump and mixes the treatment substance with the diversion flow.

9. The apparatus of claim 1 wherein the diversion flow is in a range of 3 percent to 40 percent of the flow of the liquid.

10. The apparatus of claim 1 further comprising a flow grid disposed in a second downstream location, the flow grid disposed perpendicular to the central axis, the flow grid having an upstream face and a downstream face.

11. The apparatus of claim 10 wherein the flow grid comprises a plurality of intersecting grid members.

12. The apparatus of claim 11 wherein the flow grid comprises a semi-circular shape having a diagonal base member.

13. The apparatus of claim 12 wherein a cross-sectional area of the pipe into which the flow grid is disposed defines a circle of 360 degrees with a zero degree position defined at a top of the pipe, wherein the diagonal base member has a first end adjacent to an approximate 60 degree position of the circle and the diagonal base member has a second end adjacent to an approximate 240 degrees position of the circle.

14. The apparatus of claim 12 wherein the flow grid comprises a first half of the semi-circular shape and a second half of the semi-circular shape, the first half and the second half each comprising a plurality of intersecting grid members disposed in a parallel configuration with the diagonal base member.

15. The apparatus of claim 14 wherein each intersecting grid member of the first half, from the upstream face to the downstream face, is disposed in an approximate angle of 10 degrees upward from the central axis.

16. The apparatus of claim 14 wherein each intersecting member of the second half, from the upstream face to the downstream face, is disposed in an approximate angle of 10 degrees downward from the central axis.

17. The apparatus of claim 10 wherein the flow grid comprises a plurality of square openings.

18. The apparatus of claim 17 wherein each of the square openings is approximately two inches by two inches.

19. The apparatus of claim 10 wherein the flow grid comprises a plurality of rectangular openings.

20. The apparatus of claim 19 wherein each of the rectangular openings has an approximate height of 1 inch and an approximate width of 2 inches.

21. The apparatus of claim 1 wherein the pipe has a diameter of greater than ten inches up to a diameter of eighty-four inches.

22. The apparatus of claim 1 wherein the treatment substance comprises a gas.

23. The apparatus of claim 22 wherein the first mixture comprises a gas liquid ratio of at least 5%.

24. The apparatus of claim 22 wherein the treatment substance is selected from the group of gases consisting of ozone, oxygen, chlorine and air.

25. In combination with a pipe, said pipe having a cylindrical inner wall with a central axis, providing for a flow of liquid including flow from an upstream location to a first downstream location in a full pipe flow regime, an apparatus to increase mass transfer of a treatment substance into the liquid comprises:
   (a) a diversion conduit for externally providing a diversion flow of a first portion of the liquid from said upstream location to said first downstream location, said diversion conduit receiving the diversion flow from said flow of the liquid, leaving a mainstream flow of the liquid inside the pipe flowing from the upstream location to the first downstream location;
   (b) a booster pump receiving said diversion flow and boosting its pressure;
   (c) an aspirating injector receiving said diversion flow from said booster pump and injecting a proportioned amount of treatment substance into said diversion flow;
   (d) a plurality of nozzles, each nozzle being spaced apart linearly from its adjacent nozzle, each nozzle receiving a substantially equal portion of said diversion flow with treatment substance, each nozzle so disposed and arranged as to inject its respective stream into said first downstream location; and
   (e) a plurality of flow vanes circumferentially disposed about the cylindrical inner wall, the plurality of flow vanes disposed between the upstream location and the first downstream location, each said flow vane attached to and extending from the cylindrical inner wall and extending radially inward toward the central axis from said cylindrical inner wall and extending into the main stream flow of the liquid.

26. The apparatus of claim 25 further comprising a flow grid disposed in a second downstream location, the flow grid disposed perpendicular to the central axis.

27. The apparatus of claim 26 wherein the flow grid comprises a plurality of openings.

28. The apparatus of claim 27 wherein each of the openings has an approximate area of two square inches.

29. A method of increasing mass transfer of a treatment substance into a liquid flowing through a pipe comprises:
   diverting a first portion of the liquid from a first upstream location of the pipe, leaving a main stream flow of the liquid flowing inside the pipe from the first upstream location to a first downstream location, wherein between the first upstream location and the first downstream location the main stream flow of the liquid passes through a plurality of flow vanes disposed circumferentially about, attached to, and extending from an inside wall of the pipe;

flowing the first portion of the liquid through a treatment mixing apparatus which mixes a treatment substance into the first portion of the liquid, resulting in a first mixture; and injecting the first mixture into the pipe at the first downstream location.

30. The method of claim 29 wherein the pipe comprises a flow grid disposed in a second downstream location.

31. The method of claim 29 wherein the treatment substance comprises a gas.

32. The method of claim 31 wherein the first mixture comprises a gas liquid ratio of at least 5%.

33. The method of claim 31 wherein the treatment substance is selected from the group of gases consisting of ozone, oxygen, chlorine and air.

34. The method of claim 29 wherein the first portion of the liquid comprises a range of 3 percent to 40 percent of the total liquid flowing through the pipe.

\* \* \* \* \*